J. W. HUDSON.
Tire-Upsetting Machine.

No. 225,286.   Patented Mar. 9, 1880.

Witnesses.   Inventor:
A. Ruppert   John W. Hudson.
James Lange   per Edson Bros
                   Attorneys

UNITED STATES PATENT OFFICE.

JOHN W. HUDSON, OF WELLINGTON, ILLINOIS.

TIRE-UPSETTING MACHINE.

SPECIFICATION forming part of Letters Patent No. 225,286, dated March 9, 1880.

Application filed August 28, 1879.

*To all whom it may concern:*

Be it known that I, JOHN W. HUDSON, of Wellington, in the county of Iroquois and State of Illinois, have invented certain new and useful Improvements in Tire-Upsetting Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1:
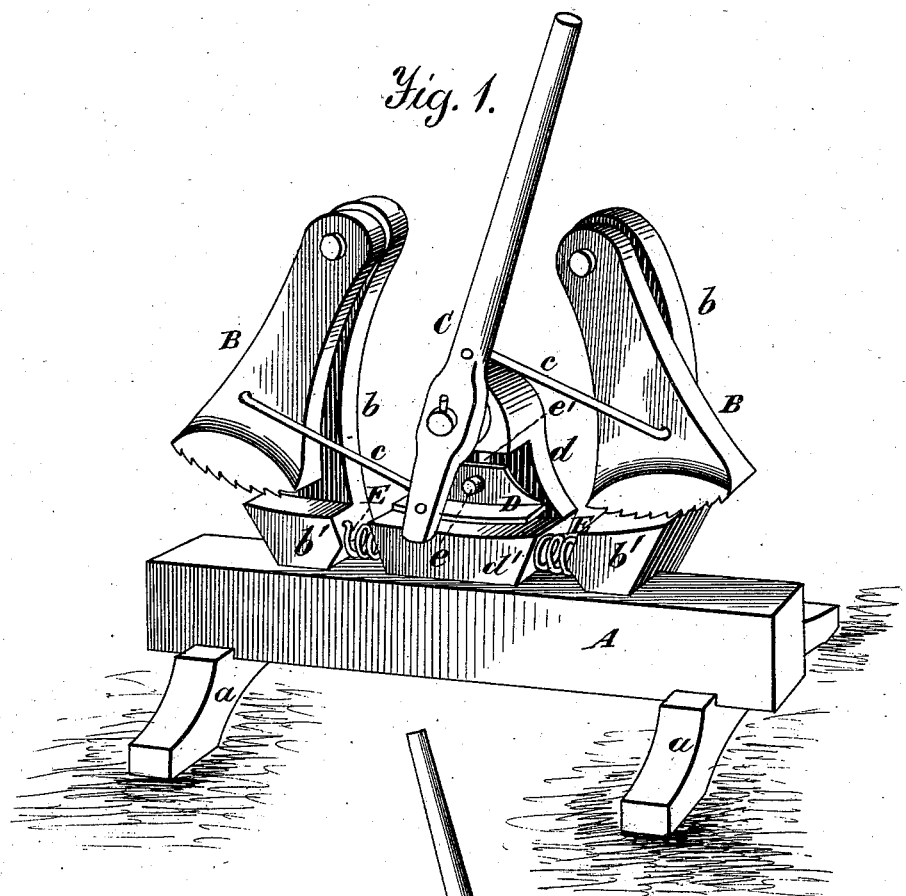
Figure 2:
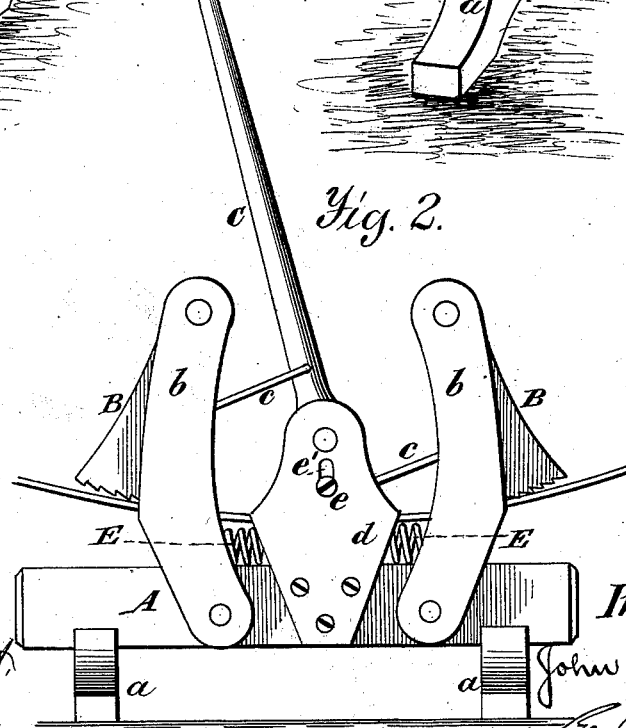

Figure 1 is a perspective view of my tire-upsetter, and Fig. 2 is a side elevation of the same.

This invention has relation to certain improvements in tire-upsetting machines; and it consists of two side jaws eccentrically connected to a centrally-pivoted lever, and of a gage-plate with an adjusting and holding screw passing through a slot in an upright or short post, substantially as hereinafter more fully set forth.

In the accompanying drawings, A marks a base or support, which may be itself supported upon transverse feet *a a*. B B refer to two side jaws hung at their upper ends to the same ends of uprights *b b*, preferably curved inwardly, and pivoted to the base A, as shown, or otherwise. The uprights *b b* are provided at their lower ends with inward lateral extensions *b' b'* for the tire to rest on when subjected to the action of the jaws. These jaws, whose lower convex ends may be serrated or toothed to better gripe the tire, are eccentrically connected by rods *c c* to a central lever, C, pivoted to an upright or short post, *d*, fastened, also, to the base A about equidistant between the jaw-supports *b*. The post *d* is also provided with an inward lateral extension, *d'*, to further support the tire.

D is a gage plate or clamp, with its convex face presented to the concaved surface of the extension *d'* of the lever-support *d*. This plate, whose function is to gage the fused portion of the tire between the jaws, is adapted to be vertically adjusted and held at any desir'' vertical adjustment to accommodate the thi ness or size of the tire by a screw, *e*, inser d through a slot, *e'*, in the lever-support *d*.

E E are springs, with their inner ends secured to opposite sides of the lever-support *d*, and acting upon the pivoted jaw-supports *b*, to permit them, as the jaws are brought upon the tire, to yield inwardly and cause their tire-supporting surfaces *b'* to conform in movement to the arc of the tire as it is upset. They also serve to force the jaw-supports apart, and in a measure free them from the tire after upsetting.

The operation of upsetting is performed by heating the defective or thinly-worn portion of the tire to a fusion-heat; then dispose it in position on the supporting surfaces or extensions of the jaw-supports and lever-support, with the gaging plate or clamp D adjusted to accommodate and gage the tire at that point. The lever C is now moved so as to cause the jaws to gripe and act upon the tire and upset it—*i. e.*, cause its fused thin portion to become thickened by the compression of the fused metal.

Various devices for a similar purpose have been produced, but they are generally complicated, and require separate mechanisms—one to gripe and one to upset.

My invention is designed not only to gripe the tire by a single set of mechanism, but to have the identical mechanism, by a further movement in the same direction, upset the tire, as is clearly shown.

The device is simple, cheap, and efficient in use. The central post, *d*, is rigid with the base, and each working-jaw operates inward by one motion of the main lever C.

Having thus fully described my invention, I claim and desire to secure by Letters Patent—

The combination of the pivoted standards *b b'*, jaws B, and base A with the pivoted lever C, links *c*, rigid standard *d d'*, and gage D *e e'*, all arranged to gripe and upset a tire by simultaneous inward movement of the operating parts and a single movement of the lever C, as specified, for the purpose set forth.

In testimony that I claim the foregoing I have hereunto set my hand this 22d day of August, 1879.

JOHN W. HUDSON.

Witnesses:
R. M. HAMILTON,
W. V. DOAN.